United States Patent
Pringle et al.

[11] Patent Number: 5,861,562
[45] Date of Patent: Jan. 19, 1999

[54] FLOW MEASUREMENT MANDREL

[75] Inventors: Ronald E. Pringle, Houston; Arthur J. Morris, Magnolia, both of Tex.

[73] Assignee: Camco International Inc., Houston, Tex.

[21] Appl. No.: 100,833

[22] Filed: Jun. 19, 1998

Related U.S. Application Data

[60] Provisional application No. 60/053,622 Jul. 24, 1997.

[51] Int. Cl.[6] ...................................................... G01F 1/44
[52] U.S. Cl. ..................................... 73/861.63; 13/152.29
[58] Field of Search ........................... 73/204.21, 861.52, 73/861.63, 861.64, 203, 152.18, 152.21, 152.29

[56] References Cited

U.S. PATENT DOCUMENTS

| | | | |
|---|---|---|---|
| 749,645 | 1/1904 | Tuttle | 73/861.64 X |
| 2,192,214 | 4/1940 | Hollander | 73/861.64 |
| 2,868,013 | 1/1959 | Terrel | 73/861.63 |
| 3,357,492 | 12/1967 | Hubby | 73/152.29 X |
| 3,454,985 | 7/1969 | Bostock | 73/152.29 X |
| 3,472,070 | 10/1969 | Chenoweth | 73/152.29 |
| 4,232,549 | 11/1980 | Migrin et al. | 73/861.63 X |
| 4,581,944 | 4/1986 | Obermann et al. | 73/861.52 X |
| 5,533,549 | 7/1996 | Sherman | 73/861.63 X |

*Primary Examiner*—Elizabeth L. Dougherty
*Attorney, Agent, or Firm*—Arnold, White & Durkee

[57] ABSTRACT

A flow measurement having a substantially cylindrical housing with a valve element connected to an inner surface thereof. The valve is movable between an open position and a closed position in the bore. A secondary flow passageway is formed in the housing and extends along the longitudinal axis of the housing. A first end of the secondary flow passageway is in fluid communication with the bore below the valve element. A flow measuring device is located near a second end of the secondary flow passageway for measuring the rate of fluid flow therethrough. The housing is adapted to be connected at each end thereof to well tubing. The present invention provides a flow measurement mandrel that diverts the production flow the secondary flow passageway by closing a hydraulically operated flapper valve and routing the fluid or gas through the a venturi flume in the secondary flow passageway for flow measurement. After monitoring flow rate, the flapper valve is re-opened and full bore production is achieved.

12 Claims, 9 Drawing Sheets

FLOW MEASUREMENT MANDREL

This application claims benefit of U.S. provisional application 60/053,622, filed on Jul. 24, 1997.

BACKGROUND OF THE INVENTION

The present invention relates to a device for measuring the flow of fluids through well bore tubing, and more specifically to a flow measurement mandrel that can be connected to a string of tubing and measure the rate of flow therethrough by diverting the flow through a secondary flow passageway without restricting the main bore of the mandrel.

Conventional methods of flow measurement through venturi flumes require a restricted through bore to provide a pressure drop and monitoring flow rate. This restricted bore prevents wireline operations. Thus, there is a need for a flow measurement device that does not require a restricted bore and will permit both full bore flow of fluids and the passage of wireline tools to the bottom of the well.

SUMMARY OF THE INVENTION

The present invention provides a flow measurement mandrel that diverts the production flow through a venturi flume in a side pocket mandrel by closing a valve, such as a hydraulically operated flapper valve, and routing the fluid or gas through the venturi flume for flow measurement. After monitoring flow rate, the flapper valve is re-opened and fall bore production is achieved.

According to one aspect of the present invention the flow measurement mandrel comprises a housing having a bore therethrough and a valve element connected to the housing and movable between an open position and a closed position in the bore. A secondary flow passageway is formed in the housing and extends along the longitudinal axis of the housing. A first end of the secondary flow passageway is in fluid communication with the bore below the valve element. A flow measuring device is located near a second end of the secondary flow passageway for measuring the rate of fluid flow therethrough. The housing is adapted to be connected at each end thereof to well tubing.

The flow measurement mandrel may further include a flow tube longitudinally movable in the housing for causing the opening and closing of the valve element. Biasing means, such as a spring or contained gas charge, may also be positioned between the housing and the flow tube for moving the flow tube in a direction to open the valve element. An actuating element, such as hydraulic piston and cylinder assembly, may be provided and is preferably located in the housing. The piston is preferably connected to the flow tube for moving the flow tube in a direction to close the valve element.

The flow measurement mandrel may further comprise means for sealing the secondary flow passageway from the bore when the valve element is in the open position. The sealing means may take the form of an annular seal positioned on an inner wall of the housing in the bore, such that when the valve element is in the open position and the flow tube is extended, a first end of the flow tube engages the annular seal to prevent flow through the secondary flow passageway. A valve seat element may also be provided for receiving the valve element in the closed position and sealing the bore.

According to one aspect of the invention, the secondary flow passageway comprises an annular flow passageway connected to a venturi flume. A first end of the annular flow passageway is preferably in fluid communication with the bore when the valve element is in the closed position. The venturi flume may be located in and extending along the longitudinal axis of the housing. A first end of the venturi flume is preferably in fluid communication with a second end of the annular flow passageway, and a second end of the venturi flume is preferably in fluid communication with the bore. The flow measuring device may preferably be located in a side pocket formed in the housing adjacent to the venturi flume. The flow measuring device may be a transducer device that measures static pressure, differential pressure and/or temperature to allow measurement of the flow of fluids through the venturi flume.

A further aspect of the present invention is a method of measuring the rate of fluid flow through a flow measurement mandrel connected to a length of tubing. The valve element located within a bore of a housing of the flow measurement mandrel is closed and the flow of fluid is diverted through a secondary flow passageway formed in the housing and extending along the longitudinal axis of the housing. The rate of fluid flow is measured through the secondary flow passageway. The flow of fluid is then directed back into the bore. The fluid may be diverted into an annular fluid passageway and then into a venturi flume where the flow rate may be measured.

DESCRIPTION OF ILLUSTRATIVE EMBODIMENTS

Referring now to the drawings, and particularly to FIGS. 2A, 2B, 2C, 2D and 2E, a flow measurement mandrel 10 is shown having a substantially cylindrical body 12 having an open bore 14 therethrough for allowing the flow of product, such as oil and gas. Various wire-line tools may also pass through the bore 14 to perform a variety of necessary functions to maintain production of the well. The flow measurement device may be connected to a string of tubing (not shown) by connectors 16, 18 at each end thereof.

An orienting sleeve 20 is positioned within the bore 14 near a first end of the flow measurement device 10. The orienting sleeve 20 includes an upwardly directed helical surface 22 for rotationally orienting a kickover tool for properly aligning a transducer or flow measurement device for insertion into a side pocket located in the housing. The orienting sleeve 20 also includes an actuating shoulder 24 for actuating a kickover tool for installing or removing the transducer or flow measurement device from the side pocket.

The orienting sleeve 20 is preferably secured to the inside of the housing 12 by conventional means, such as a weld.

Figure 1:
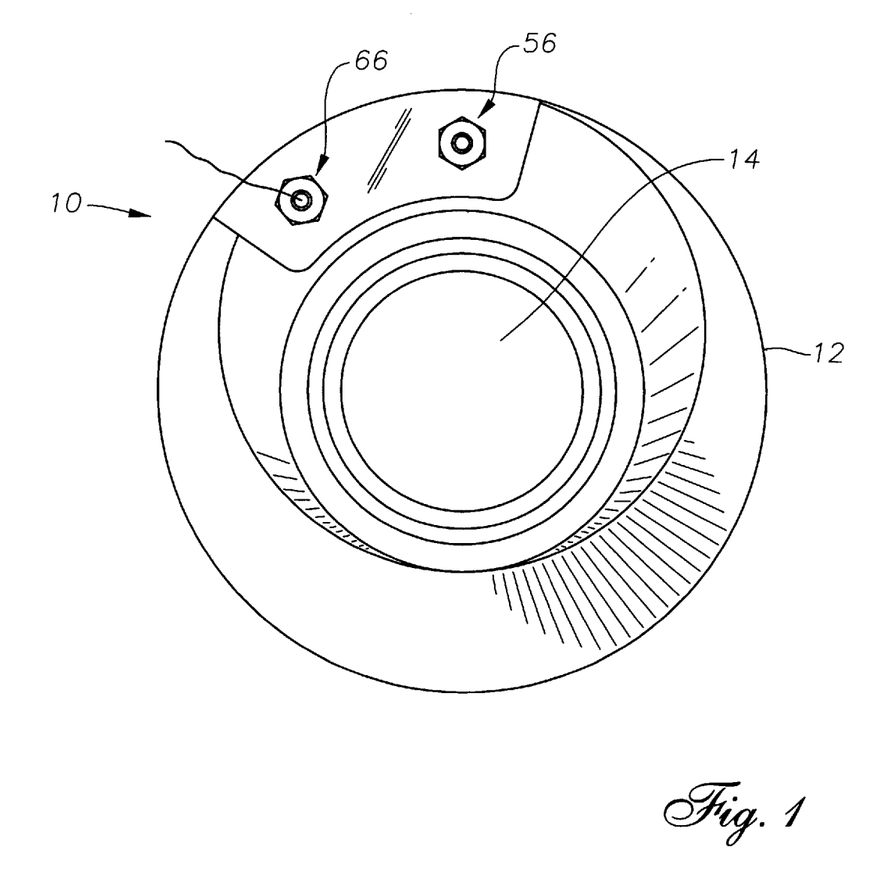
FIG. 1 shows a top plan view of a flow measurement mandrel according to an embodiment of the present invention.
Figure 2A:
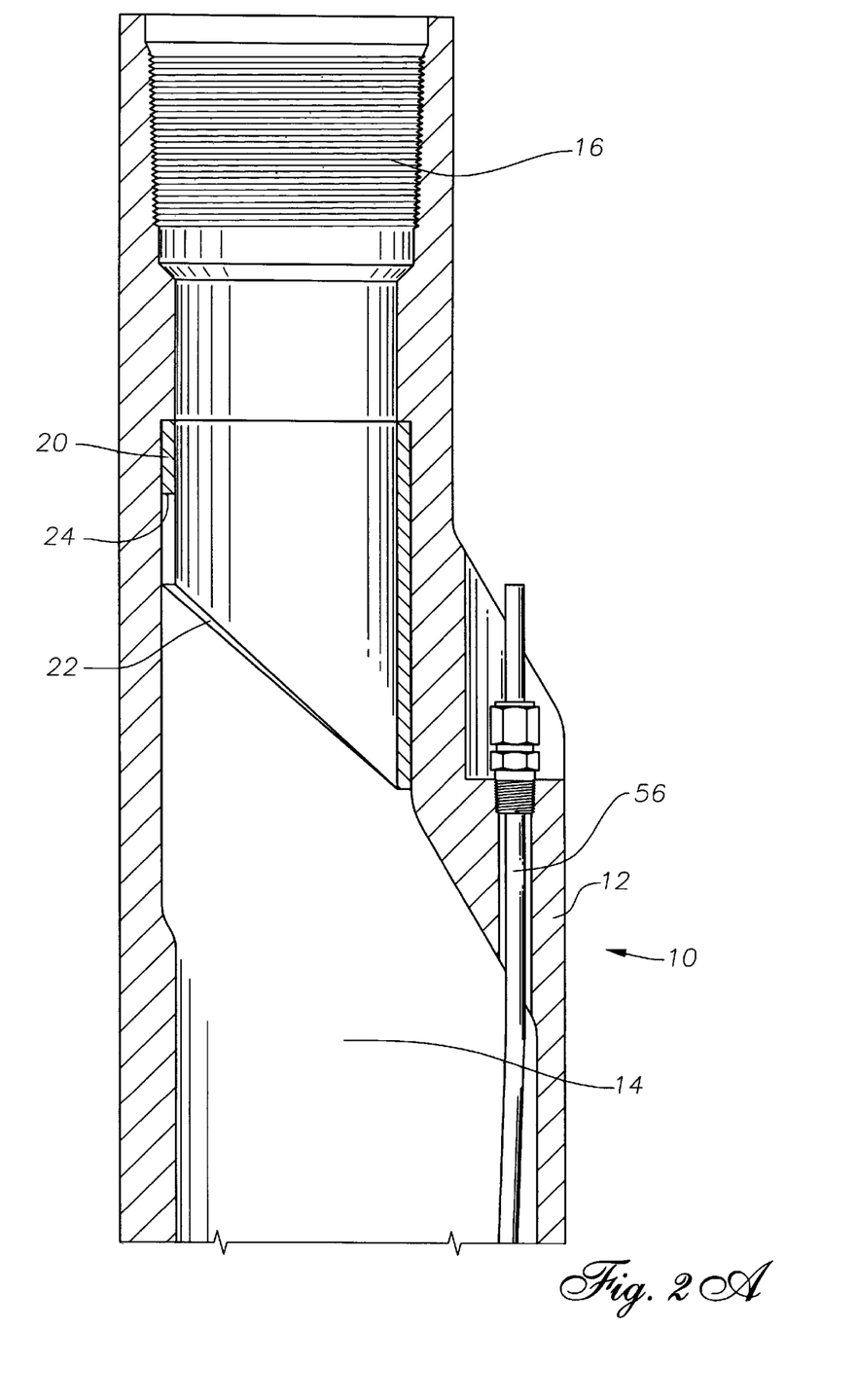
FIGS. 2A, 2B, 2C, 2D and 2E are continuations of each other and form an elevational view, in cross section, of the flow measurement device shown in FIG. 1.
Figure 2B:
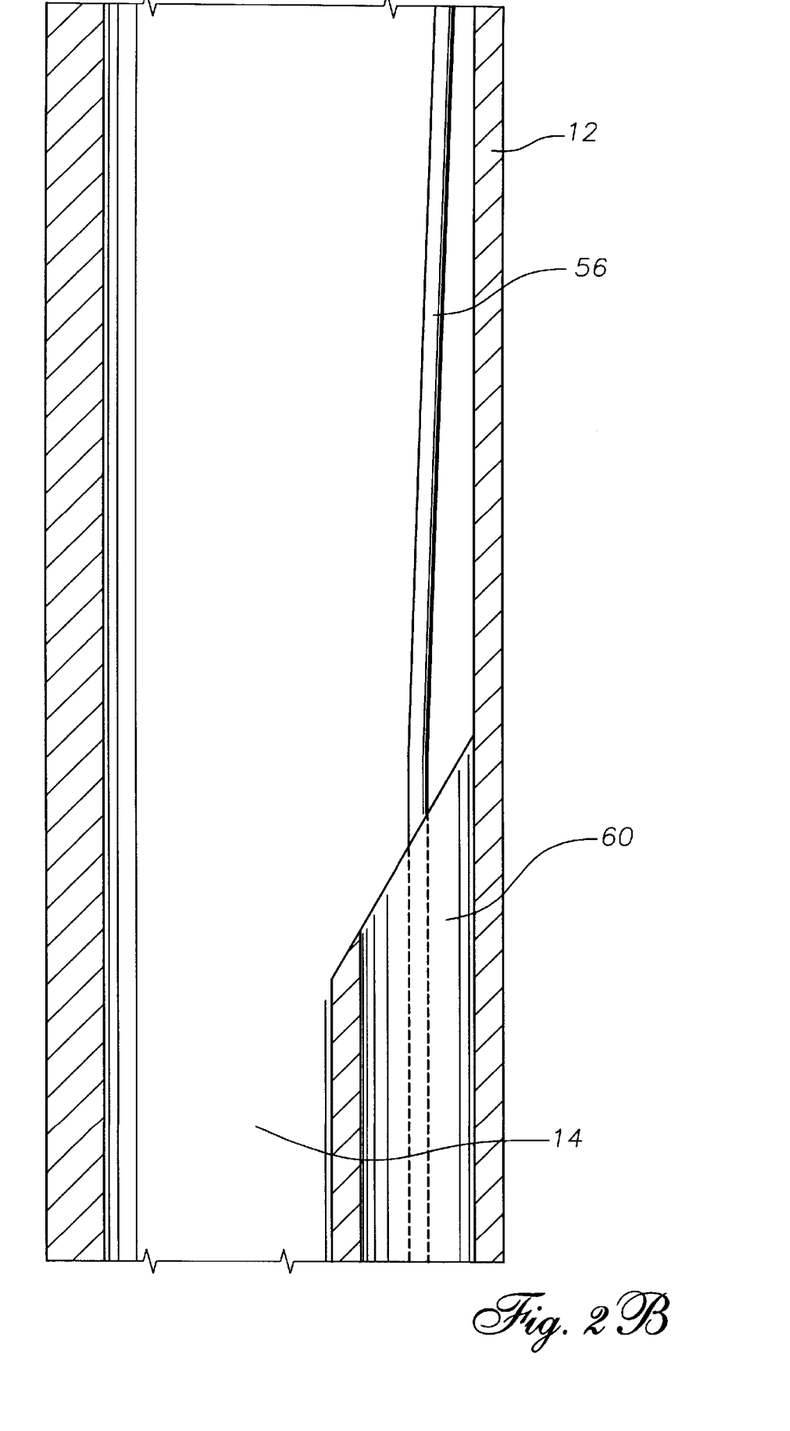
Figure 2C:
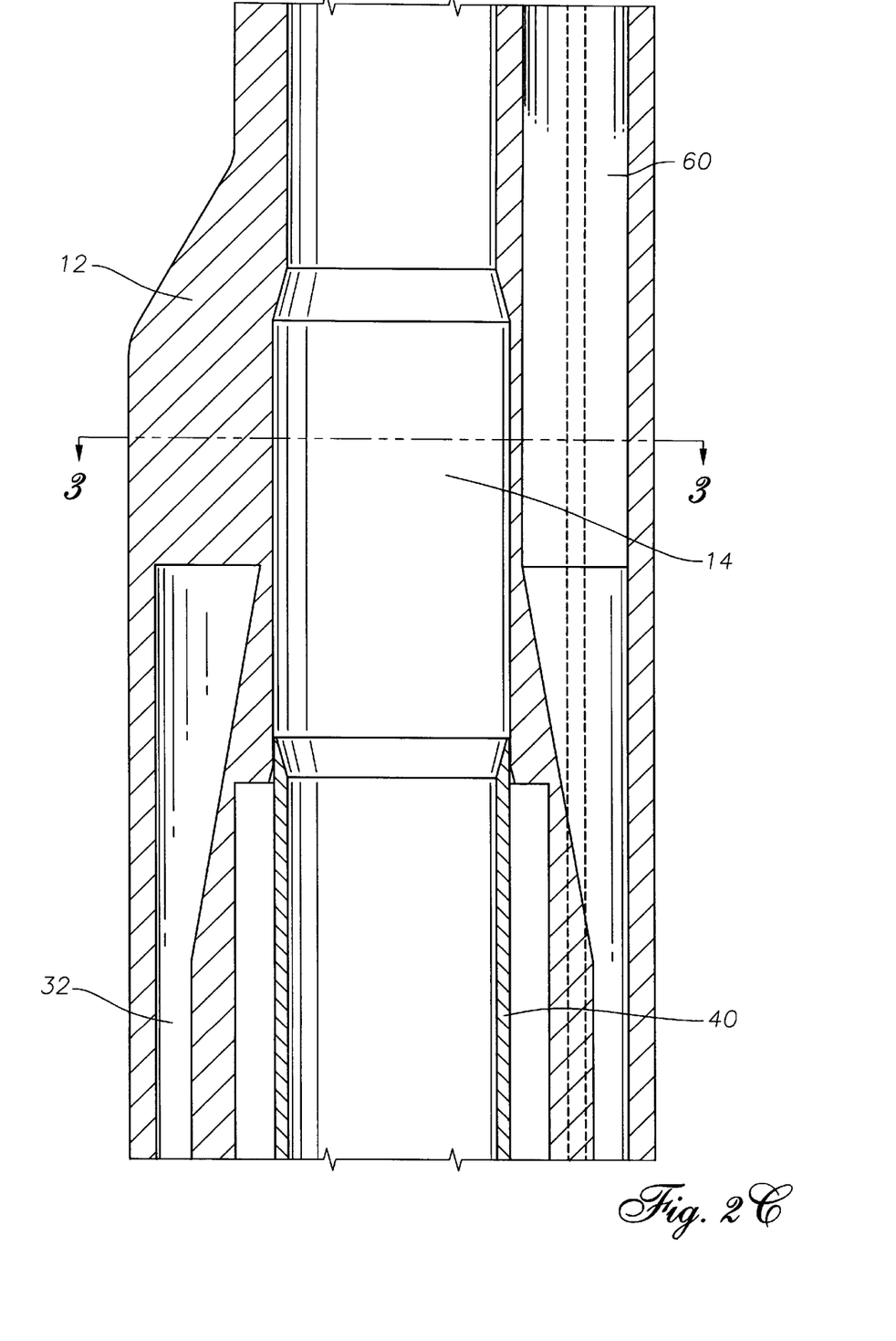
Figure 2D:
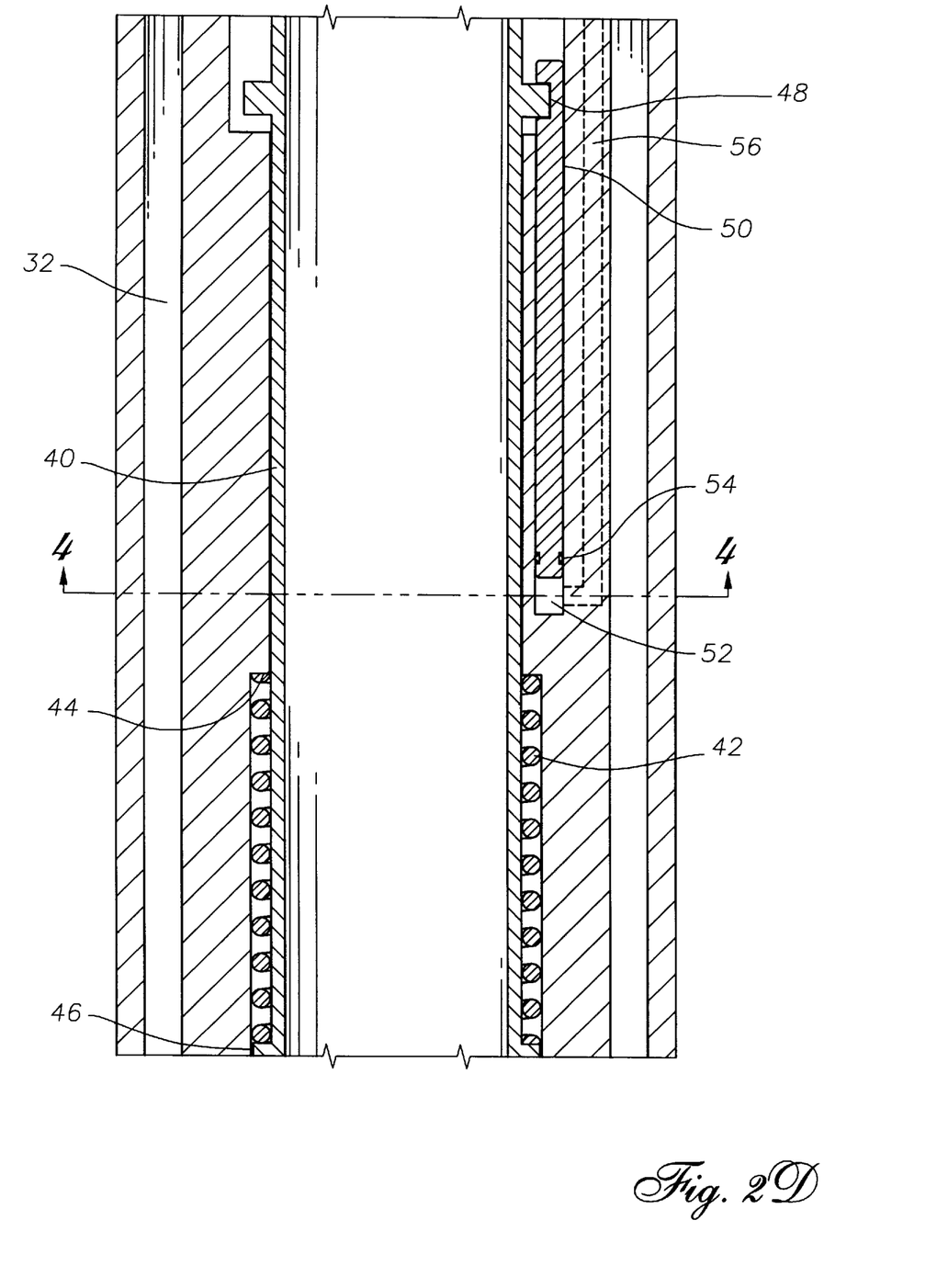
Figure 2E:
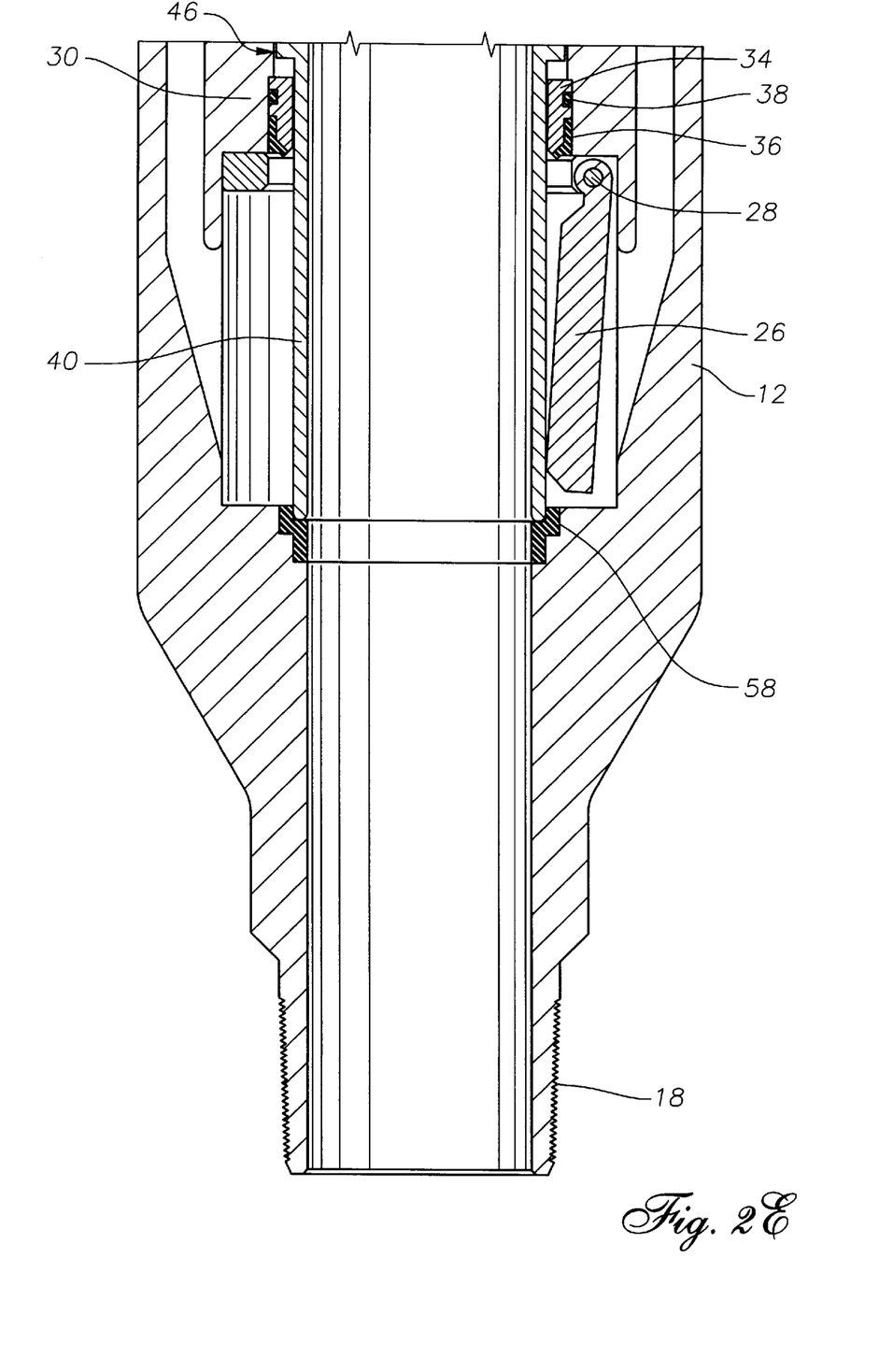

A valve element, such as flapper element 26, is provided connected to the housing on a pivot 28, and is movable from an open position, as shown in FIG. 2D to a closed position seated on a valve seat 30 for blocking flow through the main bore 14 and allowing flow to be diverted through an outer annular flow passageway 32. The valve seat 30 includes an annular metal valve member 34 for creating a primary seal and an annular plastic or elastomeric valve member 36 for creating a secondary seal when the valve 26 is in the closed position. An o-ring 38 seals the outer surface of the annular metal valve member 34 against the inner surface of the housing 12. A flow tube 40 is longitudinally movable in the housing 12 for controlling the opening and closing of the valve element 26. Biasing means, such as spring 42 acts between a shoulder 44 on the housing 12 and a shoulder 46 on the flow tube 40 to yieldably urge the flow tube 40 in a direction to engage and move the valve element 26 to an open position.

When the flow tube 40 is moved upwardly, the flapper valve 26 is freed for closure. A torsional spring element (not shown) acting on the flapper valve 26 forces the valve 26 to swing to the closed position such that the valve 26 engages the seat 30 and creates a seal. The flow tube 40 is moved upwardly, and closure of the flapper element 26 is obtained, by actuation of a hydraulic piston 50 which engages a second shoulder 48 on the flow tube 40. The hydraulic piston 50 is located in a cylinder 52 which is located in the housing 12, and has a longitudinal axis that is co-axial with the longitudinal axis of the housing 12. A piston seal means or ring 54 is provided in the outer annular surface of the piston 50 to provide a piston seal between the piston 50 and cylinder 52. The piston 50, and consequently the flow tube 40 are moved along the longitudinal axis of the flow measuring device 10 by application of hydraulic pressure through a hydraulic control line 56. Hydraulic fluid is pumped into and out of the cylinder 52 to cause movement of the piston 50 and flow tube 40 to control the opening and closing of the flapper valve 26.

When the flapper valve 26 is in the open position, as shown in FIGS. 2A–2E, the flow tube 40 holds the flapper valve in the open position. A lower edge of the flow tube is seated in an annular seal 58, which is located on the inner surface of the housing 12 near the lower end thereof. When the lower edge of the flow tube engages the seal 58, production fluid is directed through the main bore 14 of the flow measurement device 10. The seal 58 prevents leakage of production fluid into the annular flow passageway 32 during production, allowing full-bore operation of the well through the well tubing string to which the flow measurement mandrel 10 is connected.

When the flapper valve 26 is in the closed position, the valve seat 30 prevents production fluid from passing through the main bore 14 of the device. Instead, the production flow is diverted into the annular flow passageway 32. The passageway 32 widens near the upper end thereof, as best shown in FIG. 2C, and connects to a side-pocket venturi flume 60.

The flow rate is calculated by taking measurement of the fluid as it passes through the venturi flume 60. There are a number of methods known in the art that can be used to measure the flow of fluid through a passageway. For example, a turbine could be placed within the passageway to measure the flow rate. Another commonly known device for measuring fluid flow through a passageway is to insert a pitot tube into the passageway and measuring the pressure exerted on the tube by the flow at the opening. A restricted orifice of a known diameter can be placed in the passageway and transducers placed on both sides thereof to measure the pressure upstream and downstream of the orifice. From the data gathered using these methods, the flow rate can be calculated. These and other well know methods for measuring fluid flow rates can be used in conjunction with the present invention to obtain the rate of fluid flow through the venturi flume 60.

Figure 3:
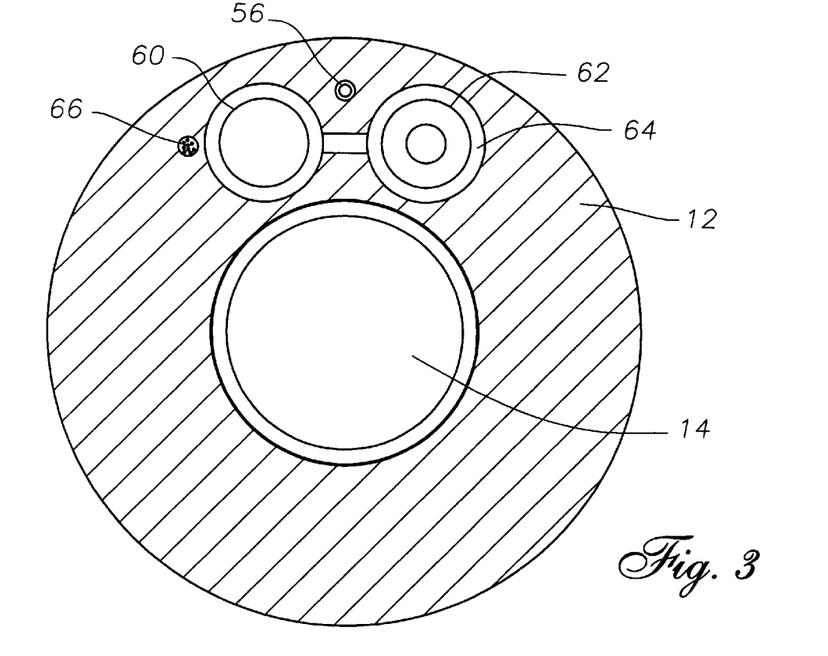
FIG. 3 is a cross-sectional view taken along the line A—A of FIG. 2C.
Figure 4:
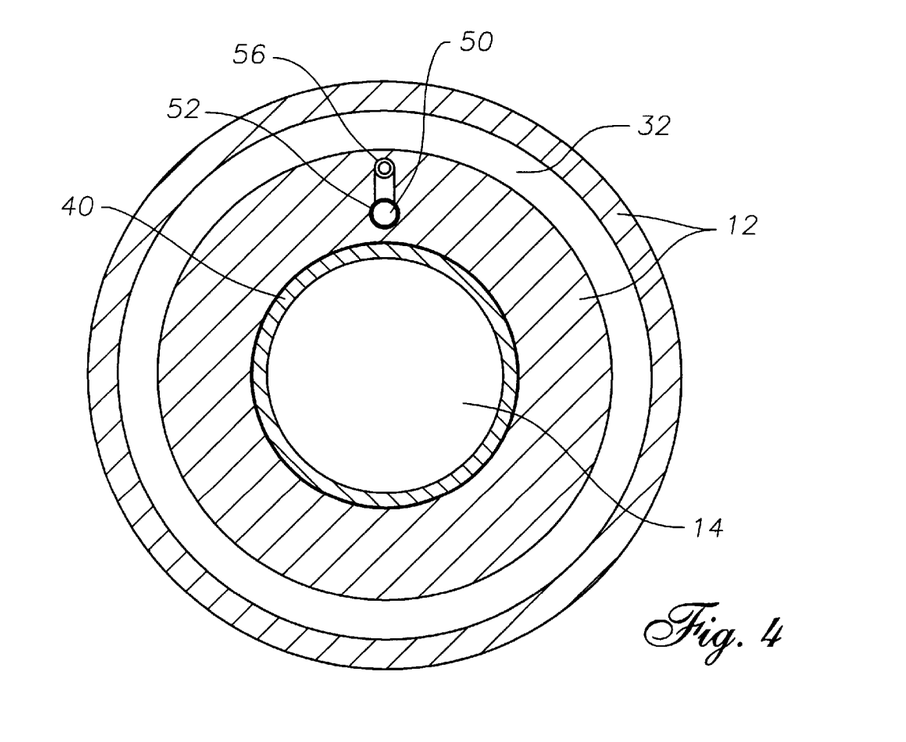
FIG. 4 is a cross-sectional view taken along the line B—B of FIG. 2D.

According to one preferred embodiment shown in FIG. 3, the venturi method of calculating flow rate is used. According to this method, a venturi flume of known dimensions is formed in the passageway. The flow through the venturi flume 60 creates a differential pressure which is measured by a flow measurement device or transducer 62 positioned in a side pocket 64 formed in the housing 12. Control lines 66 extend through the housing 12 to connect the transducer 62 to a surface controller and monitor. The control lines 66 may be either electric or fiber optic depending upon the type of transducer and controllers being used.

The transducers are typical downhole devices such as quartz or sapphire piezoelectric crystals, true differential pressure devices, such as a bellow, or a stream gauge type device—i.e. a change is stress creates a current which is calibrated in pressure, temperature or differential pressure.

Figure 5:
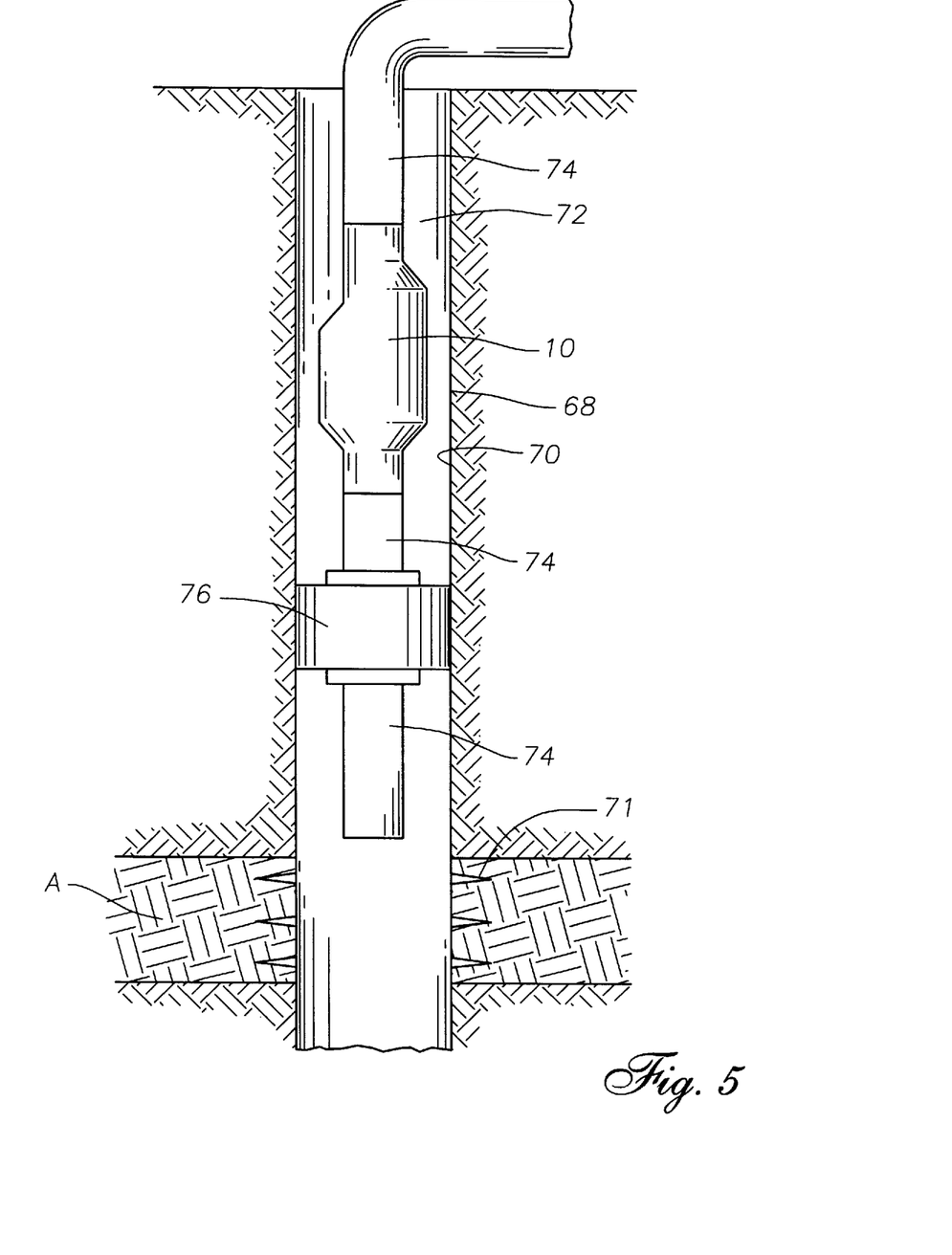
FIG. 5 is a schematic drawing of a well completion system using a flow measurement mandrel according to the present invention.

As shown in FIG. 5, the flow measurement mandrel may be connected to a string of tubing 74 and inserted into a well bore 68. The well bore 68 is lined with a tubular casing 70 that extends from the surface down to the producing geological formation A. The casing 70 includes perforations 71 in the region of the producing formation to permit the flow of gas and liquid from the formation into the casing 70 lining the well bore 68. A packer 76 is positioned about the tubing 74 above the producing formation A. The rate of flow from the producing formation A can be measured by closing the valve of the flow measurement mandrel 10 as heretofore described.

Figure 6:
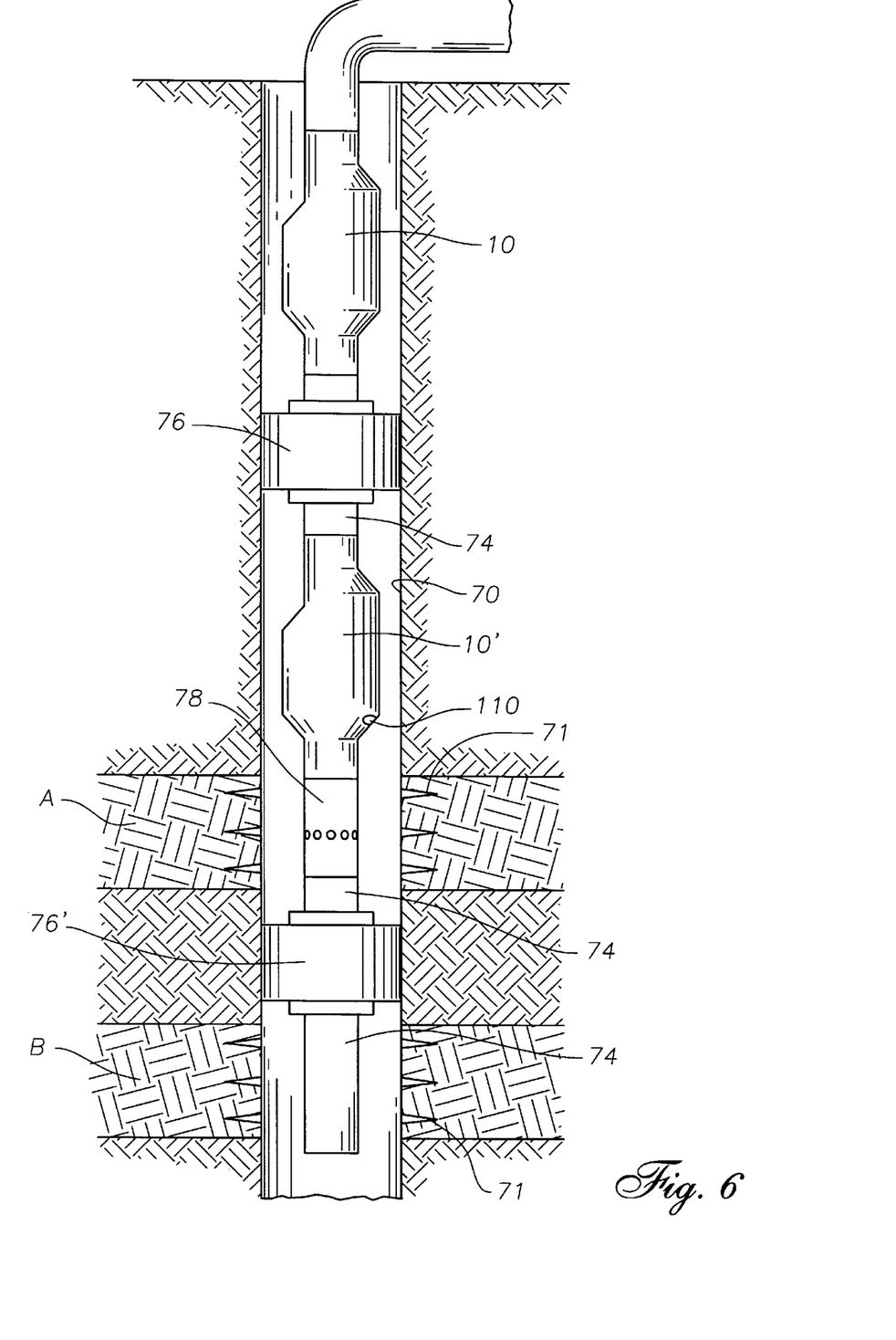
FIG. 6 is a schematic drawing of an alternative well completion system using flow measurement mandrels according to the present invention.

FIG. 6 shows a pair of flow measurement mandrels 10, 10' connected to a string of tubing 74 and inserted into a well bore 68 having two producing geological formations A, B. A first packer 76 is placed just above the upper formation A and a second packer 76' is placed just above the lower formation B. A sliding sleeve 78 is connected to the string of tubing just below the flow measurement mandrel 10'. An alternative embodiment of the flow control mandrel 10' may be utilized under such conditions. The flow control mandrel 10' according to this alternative embodiment includes an opening 110 in the housing that is in fluid communication with the venturi flume Thus, the venturi flume is in direct communication with the producing formation A. The valve member of the flow control mandrel 10' alternately permits flow through the bore while blocking flow through the venturi flume, or permits flow through the venturi flume while blocking flow through the main bore.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. A flow measurement mandrel for measuring the flow of fluid to or from a subsurface formation, said mandrel comprising:

a housing having a bore therethrough and adapted to be connected at each end thereof to well tubing;

a valve element connected to the housing and movable between an open position and a closed position in the bore;

a secondary flow passageway formed in the housing and extending along the longitudinal axis of the housing, a first end of said secondary flow passageway in fluid communication with said formation; and a flow measuring device located near a second end of the secondary flow passageway for measuring the rate of fluid flow therethrough.

2. The flow measurement mandrel of claim 1, further comprising means for sealing the secondary flow passageway from the bore when the valve element is in the open position.

3. The flow measurement mandrel of claim 1, further comprising:

a flow tube longitudinally movable in the housing for causing the opening and closing of the valve element;

spring means positioned between the housing and the flow tube for moving the flow tube in a direction to open the valve element; and a hydraulic piston and cylinder assembly located in the housing, the piston connected to the flow tube for moving the flow tube in a direction to close the valve element.

4. The flow measurement mandrel of claim 3, further comprising an annular seal positioned on an inner wall of the housing in the bore, such that when the valve element is in the open position and the flow tube is extended, a first end of the flow tube engages the annular seal to prevent flow through the secondary flow passageway.

5. The flow measurement mandrel of claim 1 further comprising a valve seat element for receiving the valve element in the closed position and sealing the bore.

6. The flow measurement mandrel of claim 1 wherein said secondary flow passageway comprises:

an annular flow passageway having a first end in fluid communication with the bore when the valve element is in the closed position; and a venturi flume located in and extending along the longitudinal axis of the housing, a first end of the venturi flume in fluid communication with a second end of the annular flow passageway and a second end of the venturi flume in fluid communication with the bore.

7. The flow measurement mandrel of claim 6 wherein said flow measuring device is located in the housing adjacent to the venturi flume and measures the flow of fluids through the venturi flume.

8. The flow measurement mandrel of claim 7 wherein the flow measuring device is a transducer, which converts pressure, temperature, and/or differential pressure to transmissible data or pulses for measuring fluid flow, and is positioned in a side pocket formed in the housing along an inner wall thereof adjacent to the venturi flume.

9. The flow measurement mandrel of claim 1 wherein said first end of said secondary flow passageway is in fluid communication with said bore.

10. A method of measuring the rate of fluid flow through a flow measurement mandrel connected to a length of tubing comprising:

closing a valve element located within a bore of a housing of the flow measurement mandrel;

diverting the flow of fluid through a secondary flow passageway formed in the housing and extending along the longitudinal axis of the housing;

measuring the rate of fluid flow through the secondary flow passageway; and directing the flow of fluid back into the bore.

11. The method of measuring the rate of fluid flow according to claim 10 wherein the step of diverting the flow of fluid comprises diverting the fluid into an annular fluid passageway and into a venturi flume.

12. The method of measuring the rate of fluid flow according to claim 11 wherein the step of measuring the fluid flow comprises measuring the fluid flow passing through the venturi flume.

\* \* \* \* \*